Oct. 27, 1964

W. J. GREENE 3,154,680

GAS ANALYSIS BY MEASURING NEGATIVE IONS
RESULTING FROM CAPTURED ELECTRONS

Filed Oct. 18, 1956

INVENTOR
WILLIAM J. GREENE

BY

INVENTOR
WILLIAM J. GREENE

United States Patent Office 3,154,680
Patented Oct. 27, 1964

3,154,680
GAS ANALYSIS BY MEASURING NEGATIVE IONS
RESULTING FROM CAPTURED ELECTRONS
William J. Greene, Scotch Plains, N.J., assignor to Air
Reduction Company, Incorporated, New York, N.Y., a
corporation of New York
Filed Oct. 18, 1956, Ser. No. 616,796
21 Claims. (Cl. 250—43.5)

This invention relates to gas analysis and more particularly to a method and means by which may be indicated and measured the presence and the percentage in a gas mixture of certain gases, notably oxygen and sulphur- or halogen-containing gases, which are capable of forming negative molecular ions. These gases, which may be called electrophilic, have the property of capturing free electrons present in an atmosphere containing such electrophilic gases. The rapidity with which on the average such free electrons are captured by the electrophilic gas to form negative ions is dependent upon the concentration of the electrophilic gas present, and this property is employed in the invention as the basis of a measurement of the concentration of such gases.

According to the invention electrons are continuously liberated in a space in which the gas to be analyzed is present, either stationarily or in a moving stream. These electrons may be generated by bombardment of the gas molecules with radioactive particles. Alternatively the electrons may be generated by the thermionic, photoelectric or other processes.

The electrons thus liberated are subject to capture by the atoms or molecules of the electrophilic gas, and the fraction of the electrons which is so captured during a controlled average available time is a measure of the concentration of electrophilic gas, the fraction so captured increasing with the concentration.

For each concentration of a given electrophilic gas there is an average or most probable "life" for free electrons therein before they will be captured, this life of course varying inversely with the concentration.

According to the invention the electrons are continuously liberated at a constant rate in the measurement region and are given an average potential residence there, i.e., an average available time of exposure to the gas mixture under analysis, by means of an electrostatic field which continuously removes the electrons from that region. This residence time is made of the same order of magnitude as or shorter than the most probable life for the electrons at the highest electrophilic gas concentration intended to be measured. At all concentrations intended to be measured, therefore, some of the electrons are captured to form gas ions but substantial numbers are removed as electrons before capture, the fraction of the electrons which are captured increasing significantly, although in general at a diminishing rate, with increasing concentration. The ratio of captured to uncaptured electrons is employed as a measure of that concentration.

To measure the ratio it is necessary to segregate the removed uncaptured electrons from the ions formed by captured electrons. In order to effect this separation, advantage is taken of the relative immobility of the heavy ions as compard to the electrons. To this end the electron-removing field is made of alternating polarity, of frequency and amplitude such that the negative ions are little affected thereby whereas the electrons, unless captured to form negative ions, are promptly removed to one of two electrodes on opposite sides of the measurement region between which the A.C. potential is applied.

In addition means are provided which impose a drift on the ions, moving them toward an additional electrode at which they are collected. With a constant rate of supply of electrons the current in this electrode provides a measure of the fraction of the electrons which is captured and hence a measure of the concentration of the electrophilic gas present. The drift may be imposed on the ions either by a streaming of the gas through the test region or by the use of a D.C. potential field.

The frequency of the electron-removing field may advantageously be made such that one-half cycle thereof is as short or shorter than the most probable life of free electrons in an atmosphere containing the electrophilic gas to be measured at the highest concentration contemplated therefore, and the strengh of the field, as determined by the amplitude of the A.C. voltage applied to the elecron-removing electrodes and their geometry, is advantageously made such that at the applied frequency the corresponding peak-to-peak amplitude of oscillation of a free electron subjected to this field is at least twice the separation of the electrodes between which the field is applied. This insures that all electrons wherever liberated between the electrodes will be removed from the space between them in the course of a half cycle of the applied A.C. field unless earlier captured by the electrophilic gas atoms or molecules to form negative ions. The strength of the field is however held low enough so that the corresponding amplitude of oscillation of the ions will be small compared to the electrode separation, to insure that very few of the negative ions created by electrophilic gas action will be absorbed by the electron-removing electrodes.

With the frequency criterion just stated the residence time of the electrons within the measurement region is made equal to or shorter than the most probable life of free electrons in the electrophilic gas intended to be measured at the highest concentration contemplated therefor. It is not however necessary to adhere strictly to this frequency criterion, it being possible to use somewhat lower frequencies in practice since not all electrons are captured even when their residence time in the gas mixture exceeds their most probable life.

The invention will now be described in further detail with reference to the accompanying drawings in which.

Figure 1:
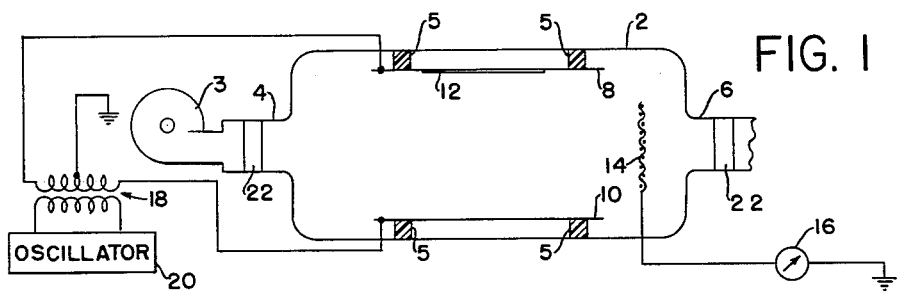
FIGS. 1–4 are diagrams illustrating four separate embodiments of the invention.

In FIG. 1 a gas chamber is indicated at 2 having inlet and outlet terminals 4 and 6 which may be connected in a gas line. Two electrodes 8 and 10 which may be of plate form are supported within the chamber 2 on supports 5 in insulation from each other. 12 denotes a quantity of radioactive material which acts as a source of alpha particles, disposed on one of the electrodes 8 and 10 in position to bombard the gas molecules in the space between those electrodes. In view of the slow decay of this material the alpha particles are given off at a constant rate and these in turn, for a given total gas pressure in the chamber, liberate electrons at a substantially constant rate from the gas.

Downstream from the electrodes 8 and 10 in the sense of gas flow, as determined for example by a pump 3, there is provided an ion collecting electrode 14 which may, for example, take the form of an open mesh screen extending crosswise of the chamber. A sensitive current measuring device 16 is connected between the screen electrode and a point of fixed potential.

The radiation source 12 emits alpha particles which by bombardment of the gas molecules produces positive gas ions and free electrons in the space between electrodes 8 and 10. Electrodes 8 and 10 are coupled, as by means of a transformer 18, to a source of A.C. potential which is shown in FIG. 1 as an oscillator 20. The D.C. potential of electrodes 8 and 10 is fixed by connecting the center tap of the secondary of transformer 18 to a point of fixed potential, preferably the same as that to which meter 16 is connected.

Oscillator 20 is operated to apply to electrodes 8 and 10 a voltage of frequency selected, with reference to the most probable life of a free electron in an atmosphere including the electrophilic gas for whose detection the instrument is intended at the highest concentration thereof intended to be measured, in accordance with the principles already discussed. Thus for example in the case of oxygen, the most probable life for free electrons is twenty microseconds in a gas mixture of one atmosphere total pressure containing 1 percent concentration of oxygen by volume. This life corresponds to a theoretical minimum frequency of $1/40$ microseconds$^{-1}$, or 25 kc. Oxygen concentrations of 1 percent can however be successfully measured with the use of rather lower frequencies, as already indicated.

The oscillator 20 is moreover operated to apply to electrodes 8 and 10 a voltage of amplitude high enough so that, at the frequency employed, the resultant field between the electrodes will impose on free electrons there an oscillating path whose peak-to-peak amplitude is at least twice the separation of electrodes 8 and 10.

With this applied field every electron liberated between the electrodes by the radioactive particle source 12 will, unless captured by an electrophilic gas atom, be collected by one or the other of electrodes 8 and 10 within the first half cycle of the applied A.C. voltage occurring after its liberation.

The residence or exposure time between the plates of the individual electrons of course depends on the location at which they are liberated and on the time phase of the applied A.C. voltage at the instant of their liberation. This exposure time will be longest for electrons liberated close to the surface of one of the plates 8 and 10 at the instant when the applied voltage crosses zero value in the sense or polarity which will attract such electrons to the more distant of the two plates. With the amplitude of the oscilatory path for the electrons above described, however, even these electrons will be collected by one of the plates within one-half cycle of the applied voltage after their liberation, unless they are earlier captured by electrophilic gas atoms.

If now there is introduced into the cell 2 at the inlet end 4 a stream of gas, the positive ions produced by alpha particle bombardment and also the negative ions produced by the capture of some of those electrons by electrophilic gas atoms (if any are present in the gas stream) will be swept downstream on to the electrode 14. On the other hand, electrons liberated by the alpha particles which are not captured will be removed at electrodes 8 and 10.

Figure 5:
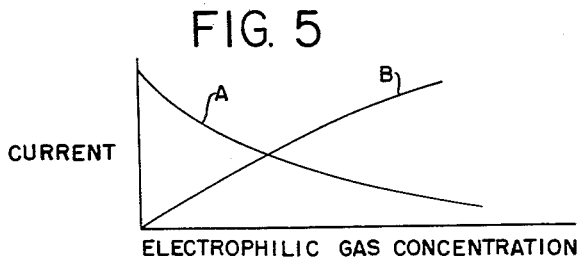
FIG. 5 is a graph useful in explaining the operation of the invention.

With zero concentration of electrophilic gases the meter 16 will indicate a current due to the positive ions collected on electrode 14. As the concentration of electrophilic gas increases, this current will decline due to the addition of electrophilic negative gas ions to the stream of charges collected on that electrode. For a given electrophilic gas such as oxygen, the meter 16 can be calibrated to read directly in percentage concentration of that gas. Curve A in FIG. 5 indicates the general nature of the variation in current observed in the instrument of FIG. 1 as a function of electrophilic gas concentration.

A single instrument can be constructed to operate over the whole range of concentrations from 0 to 100 percent or it can be constructed for fine-scale indications over a narrower range of concentrations. If the instrument is constructed to measure up to a maximum concentration below 100 percent and is energized with a correspondingly low frequency field on its electron absorbing electrodes, the change current in electrode 14 with increasing concentration will at higher concentrations decline, as the electrophilic gas "saturates" the electron supply, capturing so large a proportion of those liberated that changes in the gas to higher concentrations do not produce a satisfactory change in current. Even within the intended range of operation the relation of meter current to electrophilic gas concentrations is generally non-linear, as curve A in FIG. 5 indicates.

In the event of damage to the alpha emitter, absorptive plugs 22 may be provided at the inlet and outlet terminals of the cell to prevent the passage of radioactive apritcles out into the gas line in which the instrument is connected.

An equivalent measure of electrophilic gas concentration can be obtained by inserting the current measuring device 16 between the center tap of the secondary winding of transformer 18 and ground, to measure the current of electrons not captured. This current would also vary inversely with electrophilic gas concentration, in the general manner indicated by curve A in FIG. 5.

Figure 2:
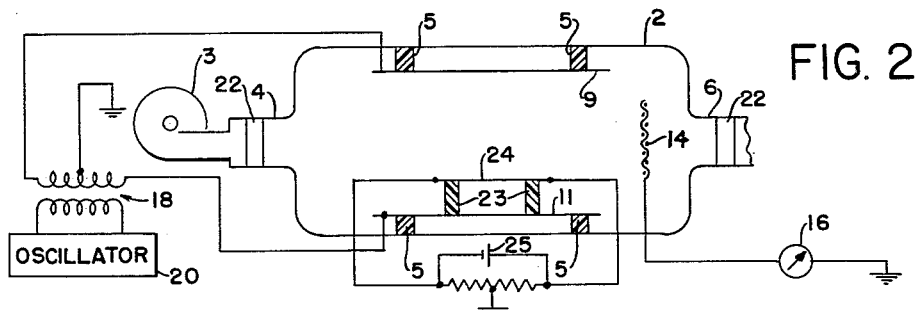

FIG. 2 illustrates a modified form of gas analysis according to the invention, differing from that of FIG. 1 in that in place of the radioactive particle source 12 shown in FIG. 1 a thermionic electron emitter 24 is arranged, as on insulating supports 23, between electron-removing electrodes 9 and 11. The emitter 24 may for example be of filamentary shape, in which case the electrodes 9 and 11 may be of substantially semicyclindrical shape instead of the plane shape of electrodes 8 and 10 in FIG. 1.

The filament 24, energized at a voltage source 25, is insulated from the electrodes 9 and 11 for A.C. but is D.C. connected to them, for example via the mid tap of the secondary winding of transformer 18. The filament is also D.C. connected to the terminal of current indicator 16 opposite the ion collecting electrode 14.

Since the filament 24 produces no positive ions, the variation of current with electrophilic gas concentration observed in the meter 16 of FIG. 2 is opposite in sense to the current variation in the embodiment of FIGURE 1. Its general shape is indicated at curve B in FIG. 5. For a zero concentration of electrophilic gases in the gas mixture passing through the cell, the current starts out at or near zero value and increases with increasing concentration of electrophilic gas.

An equivalent measure of electrophilic gas concentration can, of course, be obtained by inserting the current measuring device in the D.C. path between electrodes 9 and 11 on the one hand and the filament 24 on the other, e.g., between the center tap of the secondary winding of transformer 18 and ground, in the circuit of FIG. 2. With the current indicator so located, it would measure the fraction of the electrons emitted by filament 24 which are not captured by electrophilic gas atoms, so that this current would decline with increasing concentration of such gases in the gas mixture passing through the cell. Filament 24 is operated to emit a constant flow of electrons which divides into two currents of negative charges, one going in the form of electrons to the electrodes 9 and 11 and the other going in the form of negative gas ions to the ion connector electrode 14.

Figure 3:
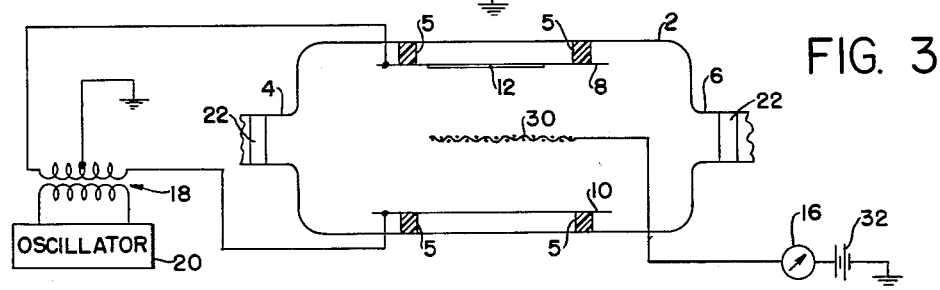
Figure 4:
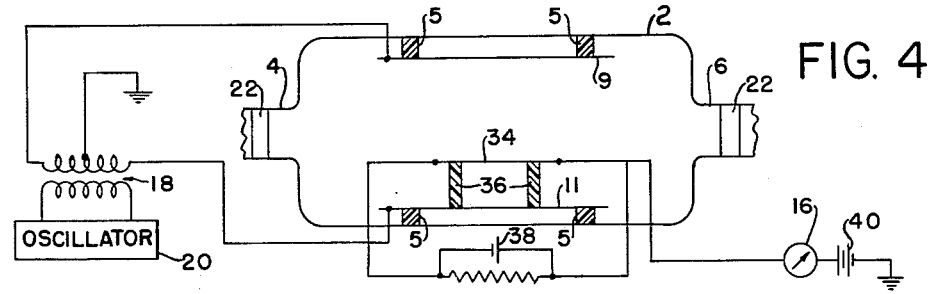

FIGS. 3 and 4 illustrate two further embodiments of the invention. In these embodiments the separation of uncaptured electrons from negative gas ions employs a D.C. field in place of a streaming of the gas mixtures to be analyzed. The embodiments of FIGS. 3 and 4 may thus be used to analyze very small samples of gas which are insufficient to cause a gas current through the cell, although they may also be used for continuous analysis of flowing gas streams.

The embodiment of FIG. 3 is similar to that of FIG. 1 except that the ion collector electrode, indicated at 30 is located between the electron-removing electrodes 8 and 10, i.e., in the measurement region itself, and except that a source of D.C. potential 32 is connected between that electrode and the average potential point of electrodes 8 and 10, the source 32 being connected with its positive terminal adjacent electrode 30. This is indicated in FIG. 3 by the grounding of the negative terminal of source 32 and of the mid tap of the secondary winding of transformer 18. Between electrode 30 and electrodes 8 and 10, therefore, there is superposed a D.C. field on the A.C. field existing between electrodes 8 and 10. The source 32 may be of much lower voltage than the peak voltage difference applied between the electron-removing electrodes.

Under these conditions uncaptured electrons are drawn to electrodes 8 and 10 by the A.C. field as in the embodiments previously described. The negative ions are attracted to electrode 30 and the positive ions are drawn to electrodes 8 and 10 by the D.C. field produced by source 32. The only current of charges flowing to electrode 30 is that due to the negative ions. For zero concentration of electrophilic gas this current is of small or zero value but increases directly with electrophilic gas concentration in the manner generally indicated by curve B in FIG. 5.

A measure of electrophilic gas concentration can also be had in the embodiment of FIG. 3 by measuring the D.C. current flowing to electrodes 8 and 10. For this measurement the current indicator can be connected between ground and the mid tap of the secondary winding of the transformer 18 in FIG. 3. For zero electrophilic gas concentrations this current will be zero, being the algebraic sum of the positive ion charges collected on electrodes 8 and 10 and of the negative electron charges there collected. With increasing electrophilic gas concentration the negative electron charge so flowing will decline so that the net positive charge flowing from electrodes 8 and 10 to ground will increase with increasing electrophilic gas concentration.

FIG. 4 illustrates a modification of the apparatus of FIG. 3 employing a thermionic source of electrons in place of the radioactive particle source employed in FIG. 3. An emitter 34 which may be filamentary in shape is arranged on insulating supports 36 between two electrodes 9 and 11 which may advantageously be of the same cylindrical shape mentioned in connection with FIG. 2. The filament is heated in a suitable manner to thermionic emission as by means of a battery 38. The filament is further connected to the positive terminal of a source 40 of polarizing voltage, the other terminal of which is connected to the mid tap of the secondary winding of a transformer 18 which, as in the previous embodiments, applies an A.C. voltage to the electrodes 9 and 11 on opposite sides of the measurement region in order to sweep therefrom electrons not captured by electrophilic gases. A current indicator 16 is connected to measure the average net space current between the filament 34 on the one hand and electrodes 9 and 11 on the other. This current varies inversely with electrophilic gas concentration and thus provides a measure of that concentration. For zero concentration the space current is large. With growing electrophilic gas concentration there is an increasing number of negative ions formed between electrodes 9 and 11. These are drawn back to the filament 34 by the field generated by source 40 so as to reduce the net space current flowing between said filament 34 and electrodes 9 and 11. It is evident that the meter 16 measures the same current whether connected between filament 34 and ground or between the mid tap of the secondary winding of transformer 18 and ground.

While the invention is broadly operable with a thermionic as distinguished from a radioactive, photoelectric, ultraviolet, or other source of electrons, it may be noted that some electrophilic gases, notably oxygen, provide with other gas constituents, for example those of air, a highly combustible mixture which precludes the use of a thermionic electron source.

Figure 6:
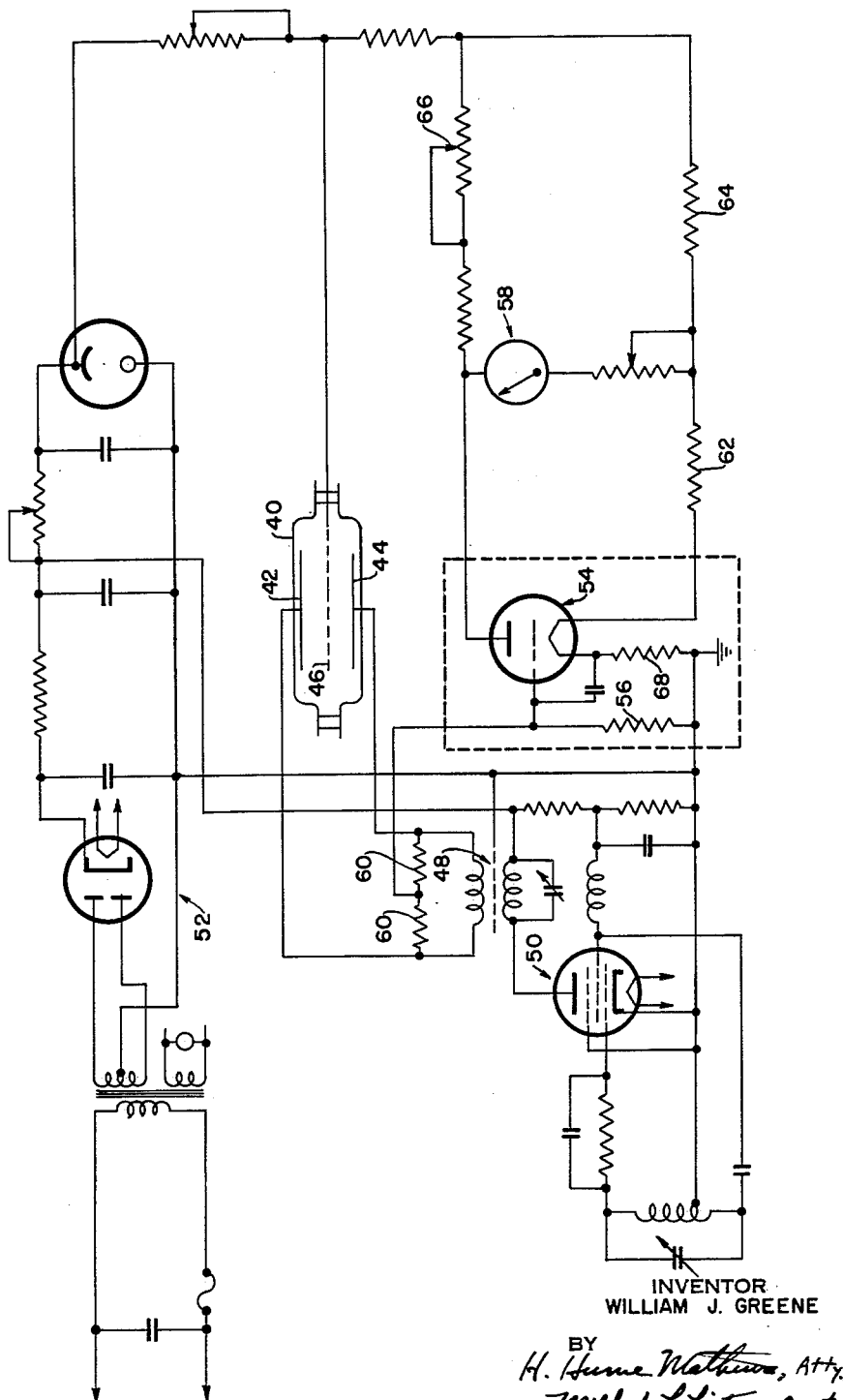
FIG. 6 is a schematic diagram of a preferred embodiment of the invention of the type diagrammatically shown in FIG. 3.

FIG. 6 is a schematic diagram of a preferred form of gas analysis apparatus according to the invention, conforming generally to the type illustrated diagrammatically in FIG. 3. In FIG. 6 the gas analysis chamber or cell is indicated at 40. It may be made of a synthetic, electrically non-conducting material. The chamber 40 contains electron sweeping electrodes 42 and 44 between which is disposed an ion collector electrode 46. A small quantity of radioactive material is disposed within the cell, for example, on the face of one of the electrodes 42 and 44 facing the other of those electrodes, in position to liberate electrons in the space between those electrodes by bombardment of the gas molecules. Electrodes 42 and 44 are connected to the ends of the secondary winding of a transformer 48 whose primary winding is in the plate circuit of a vacuum tube oscillator generally indicated at 50. The oscillator 50 is adjusted to operate at a frequency and to provide across electrodes 42 and 44 a voltage of amplitude which are selected in accordance with the criteria already discussed. For example, with a spacing between electrodes 42 and 44 of the order of 1/8″ and for measurement of concentrations of oxygen up to 100%, a frequency of about 700 kc. can be employed with a peak voltage amplitude between electrodes 42 and 44 of the order of 1000 volts. This provides fully satisfactory measurements of oxygen concentration up to 100% despite an indicated frequency of 2.5 mc. or higher.

A power supply generally indicated at 52 provides D.C. potentials for energization of the oscillator 50, for polarizing the ion collector electrode 46 and also for the operation of the current measuring circuit now to be described. In the instrument described in the preceding paragraph the electrode 46 may be operated at about 20 volts positive potential with respect to the midpoint of the secondary winding of transformer 48.

The currents to be measured are extremely minute, of the order of $10^{-9}$ amperes, for example. It is therefore not advantageous, particularly in an instrument intended for portable use, simply to connect a galvanometer in the D.C. circuit of the ion collector electrode 46 or of the electron-removing electrodes 42 and 44. Consequently the embodiment of FIG. 6 includes a vacuum tube amplifying stage which controls the current through a microammeter 58. A triode vacuum tube 54 of extremely high input impedance is provided, driven by the net current flowing between the electron-removing electrodes 42 and 44 on the one hand and ground on the other. A resistor 56 which may be of the order of 10⁹ ohms is connected between ground and the control grid of tube 54.

The grid of tube 54 is further connected to the junction of two equal resistors 60 which are connected in series across the transformer secondary. The plate-cathode impedance of tube 54 is then connected in a Wheatstone bridge circuit whose other arms include resistors 62, 64, and 66. A resistor 68 which carries the heater current of tube 54 is provided to give the tube a desired cathode bias.

The operating conditions of the tube may then be adjusted with respect to the bridge circuit constants so that the bridge is in balance with zero reading on meter 58 when the current through resistor 56 corresponds to the minimum concentration desired to be read of the electrophilic gas for whose analysis the instrument is intended. For example if the instrument is intended to measure the percentage of oxygen in an oxygen-enriched air atmosphere, the dial of meter 58 may be calibrated to read in oxygen percentages between 20 percent and 100 percent, with adjustments made so that the current through meter 58 is zero when air without admixture of added oxygen is sent through the cell 40. Of course the instrument may, however, be calibrated and the circuit set up to measure any range of electrophilic gas concentrations beginning with zero or with any other percentage.

If the meter is to read from zero concentration the bridge must be arranged for balance with zero current through resistor 56 since a zero percentage of electrophilic gas means the generation of equal numbers of electrons and positive ions, all of which are connected at electrodes 42 and 44. Increasing current through resistor 56 then changes the output impedance of the tube and upsets the bridge balance to give a reading on meter 58.

Higher electrophilic gas concentrations than that for which the bridge is to be balanced increase the net current of positive charges through resistor 56, as the number of electrons collected by plates 42 and 44 decline while the number of positive ions collected remains unchanged.

In the embodiment of FIG. 6 the current measured by means of the Wheatstone bridge circuit just described is the excess of positive ions over electrons collected at electrodes 42 and 44 rather than the negative ion current flowing in electrode 46. This choice makes it possible to effect a partial cancellation of the non-linearities of the cell 40 and electrometer tube 54. While both the net positive ion current in electrodes 42 and 44 and the negative ion current in electrode 46 increase in absolute magnitude with increasing electrophilic gas concentration, the effect of increasing positive ion current is to raise the grid potential in the tube 54 with the circuit of FIG. 6 whereas the effect of increasing negative ion current, if it instead were passed through resistor 56, would be to reduce that grid potential. With such declining grid potential the rate of change of tube output impedance declines. Hence if tube 54 were connected to carry in its grid resistor 56 the negative ion current flowing in electrode 46, the saturation effect in the cell whereby the rate of change in the percentage of electrons captured declines with increasing electrophilic gas concentration would be compounded with the non-linearity of tube 54. The sum of these non-linearities would then be reflected in the calibration of meter 58. In the circuit of FIG. 6 on the other hand these two non-linearities act differentially.

While the invention has been described in terms of its preferred practice and in terms of a number of preferred embodiments, departures may be made from the procedure and apparatus thus described within the scope of the invention as set forth in the appended claims.

We claim:

1. The method of analyzing a gas mixture for gases capable of capturing free electrons to form negative ions which comprises liberating electrons in a region containing said gas mixture, exposing said electrons to said mixture for a controlled average length of time, separating negative ions formed by capture of said electrons from those of said electrons not captured, and measuring one of the currents of charged particles so separated.

2. The method of analyzing a gas mixture for gases capable of capturing free electrons to form negative ions which comprises liberating electrons at a substantially constant rate in a region containing said gas mixture, continuously withdrawing said electrons from said region, separating negative ions formed by capture of said electrons from those of said electrons not captured, and measuring one of the currents of charged particles so separated.

3. The method of analyzing a gas mixture for gases capable of capturing free electrons to form negative ions which comprises liberating electrons at a constant rate in a measurement region, applying an A.C. potential gradient to said region in a first direction, imposing upon negative ions in said region a drift in a second direction, and measuring one of the currents of charged particles produced by said gradient and drift.

4. The method of analyzing a gas mixture for gases capable of capturing free electrons to form negative gas ions which comprises liberating electrons at a substantially constant rate in a region containing said gas mixture, imposing across said region in one direction a field adapted to remove electrons from said region, imposing across said region in another direction a drift on negative gas ions, and measuring one of two currents one of which comprises said removed electrons and the other of which comprises said negative gas ions.

5. The method of analyzing a gas mixture for gases capable of capturing free electrons to form negative gas ions which comprises liberating electrons at a substantially constant rate in a region containing said gas mixture, imposing across said region in a first direction an A.C. field, imposing across said region in another direction a D.C. field, and measuring the current produced by one of said fields.

6. The method of analyzing a gas mixture for gases capable of capturing free electrons to form negative ions which comprises liberating electrons at a substantially constant rate in a region containing said gas mixture, imposing across said region in one direction an A.C. field adapted to remove electrons from said region, causing said gas mixture to stream through said region in another direction, and measuring one of two currents one of which comprises said removed electrons and the other of which comprises negative gas ions removed from said region with said gas stream.

7. The method of analyzing a gas mixture for gases capable of capturing free electrons to form negative gas ions which comprises liberating electrons at a substantially constant rate in a region containing said gas mixture, imposing across said region in one direction an A.C. field adapted to remove electrons from said region within a time after their liberation of the same order of magnitude as the most probable life of said electrons in said gas mixture before capture, imposing across said region in another direction a drift on negative gas ions, and measuring one of two currents one of which comprises said removed electrons and the other of which comprises said negative gas ions.

8. The method of analyzing a gas mixture for gases capable of capturing free electrons to form negative gas ions which comprises liberating electrons at a substantially constant rate in a region containing said gas mixture, imposing across said region in a first direction an A.C. field of strength and frequency proportioned to remove said electrons from said region in a time of the same order of magnitude as the most probable time of capture of electrons by said gases, said field being proportioned to remove from said region relatively few of said negative gas ions formed by capture of said electrons, streaming said gas mixture through said region in another direction, and measuring one of the two currents of charged particles abstracted from said region by said A.C. field and streaming.

9. The method of analyzing a gas mixture for gases capable of capturing free electrons to form negative gas ions which comprises liberating electrons at a substantially constant rate in a region containing said gas mixture, imposing across said region in a first direction an A.C. field of strength and frequency proportioned to remove said electrons from said region in a time of the same order of magnitude as the most probable time of capture of electrons by said gases, said field being proportioned to remove from said region relatively few of the negative gas ions formed by capture of said electrons, imposing on negative ions in said region a drift in another direction, and measuring one of the two currents of charged particles produced from said electrons in said region.

10. Apparatus for the detection of gases capable of capturing electrons to form negative ions, said apparatus comprising means to liberate electrons in a gas-filled region, means to sweep electrons from said region in a first direction, means to sweep negative ions from said region in a second direction, and means to measure one of the currents of charged particles so swept from said region.

11. Apparatus for the detection of gases capable of capturing electrons to form negative ions, said apparatus comprising means to liberate electrons in a gas-filled region, two electrodes positioned to establish therebetween a field across said region, a third electrode, means to remove negative ions from said field to said third electrode, and means to measure the current flowing in one of said electrodes due to the liberation of said electrons.

12. Apparatus for gas analysis comprising a pair of electrodes, means to liberate electrons at a substantially constant rate in a gas between said electrodes, means to apply an A.C. potential between said electrodes, and an electrode adapted to collect negative gas ions formed between said first-named electrodes.

13. Apparatus for gas analysis comprising an envelope, two electrodes positioned to develop therebetween a field in a space within said envelope, means to liberate electrons at a substantially constant rate in a gas in said space, means to apply an A.C. potential between said electrodes, an ion-collecting electrode within said envelope, and means to measure one of the currents flowing in said electrodes as a result of liberation of said electrons.

14. Apparatus for gas analysis comprising an envelope, a pair of electrodes, means to liberate electrons at a substantially constant rate in a gas between said electrodes, means to apply an A.C. potential between said electrodes, an electrode adapted to collect negative gas ions, and means to measure one of the curents flowing between said last-named electrode and a point of fixed potential and between said pair of electrodes and a point of fixed potential.

15. Apparatus for gas analysis comprising a pair of electrodes, means to liberate electrons at a substantially constant rate in a gas between said electrodes, means to apply an A.C. potential between said electrodes, means connecting said electrodes for direct current to a first point of fixed potential, a third electrode, means connecting said third electrode for direct current to a second point of fixed potential positive with respect to the first, and means to measure one of the currents flowing to said points of fixed potential.

16. Apparatus for gas analysis comprising means to pass a stream of gas through a region, a pair of electrodes disposed to develop therebetween a field in said region, means to liberate electrons at a substantially constant rate in the gas in said region, means to apply an A.C. potential between said electrodes, means coupling said electrodes to a point of fixed potential, an electrode positioned downstream of said stream with respect to said first-named electrodes, means coupling said downstream electrode to a point of fixed potential, and means to measure one of the currents flowing in said pair of electrodes and in said downstream electrode.

17. Apparatus for gas analysis comprising an envelope, means to liberate electrons at a substantially constant rate in a gas within said envelope, two electrodes positioned to establish therebetween a field across said region, means to apply between said electrodes a field of such frequency and amplitude that free electrons in said region are drawn to said electrodes within a half cycle of said frequency after their liberation whereas negative ions formed in said region are substantially unaffected by said field, a third electrode, means to impose on negative ions in said region a drift toward said third electrode, and means to measure one of the currents produced in said electrodes by liberation of said electrons.

18. Apparatus for analysis of gases capable of capturing free electrons to form negative ions, said apparatus comprising an envelope, two electrodes supported within said envelope in spaced relation, means to liberate electrons at a substantially constant rate in a gas in the space between said electrodes, means to apply between said spaced electrodes an A.C. potential having a frequency whose half period is of the same order of magnitude as the most probable life of an electron before capture in a mixture of gases containing said gases at the maximum concentration thereof intended to be measured, said potential further having an amplitude sufficiently high to remove to one of said electrodes free electrons liberated in said region within one-half cycle of said frequency after their liberation but sufficiently low to hold the amplitude of oscillation of negative ions in said region to a magnitude small in comparison with the separation of said electrodes, an ion-collecting electrode adjacent said region, means to impose on negative ions in said region a drift toward said ion-collecting electrode, and means to measure one of the currents produced in said electrodes by the liebration of said electrons.

19. Apparatus for detection of gases capable of capturing electrons to form negative ions, said apparatus comprising an envelope, a pair of electrodes supported within said envelope in spaced relation, radioactive means to liberate electrons at a substantially constant rate between said electrodes by bombardment of gas molecules, an electron tube oscillator, a transformer coupling said oscillator to said electrodes, a vacuum tube amplifier, a grid resistor for said amplifier coupled between the midpoint of the secondary winding of said transformer and a first point of substantially fixed potential, a third electrode positioned between the electrodes of said pair, means connecting said third electrode to a second point of substantially fixed potential positive with respect to said first point of fixed potential, and a Wheatstone bridge circuit including the plate-cathode impedance of said amplifier in one of the arms thereof.

20. Apparatus for gas analysis comprising a pair of electrodes, means to liberate electrons at a substantially constant rate in a gas between said electrodes, means to apply an A.C. potential between said electrodes, means connecting said electrodes for direct current to a first point of fixed potential, a third electrode positioned between said pair of electrodes, means connecting said third electrode for direct current to a second point of fixed potential positive with respect to the first, and means to measure one of the current flowing to said points of fixed potential.

21. An apparatus for determining the quantity of one gas in a gas mixture comprising: a closed chamber filled with the gas mixture; a pair of spaced plate electrodes disposed in said chamber; a grid member disposed between said spaced plates; circuit means for imposing a high frequency alternating voltage on said plates and a D.C. voltage on said grid and both of said plates; and means for irradiating the gas mixture in the chamber to ionize said gas mixture.

References Cited in the file of this patent

UNITED STATES PATENTS

| | | |
|---|---|---|
| 2,594,777 | Hicks | Apr. 29, 1952 |
| 2,761,976 | Obermaier et al. | Sept. 4, 1956 |
| 2,786,144 | Weisz | Mar. 19, 1957 |